(No Model.)
O. B. SHALLENBERGER.
ALTERNATE CURRENT ELECTRIC MOTOR.
No. 398,457. Patented Feb. 26, 1889.
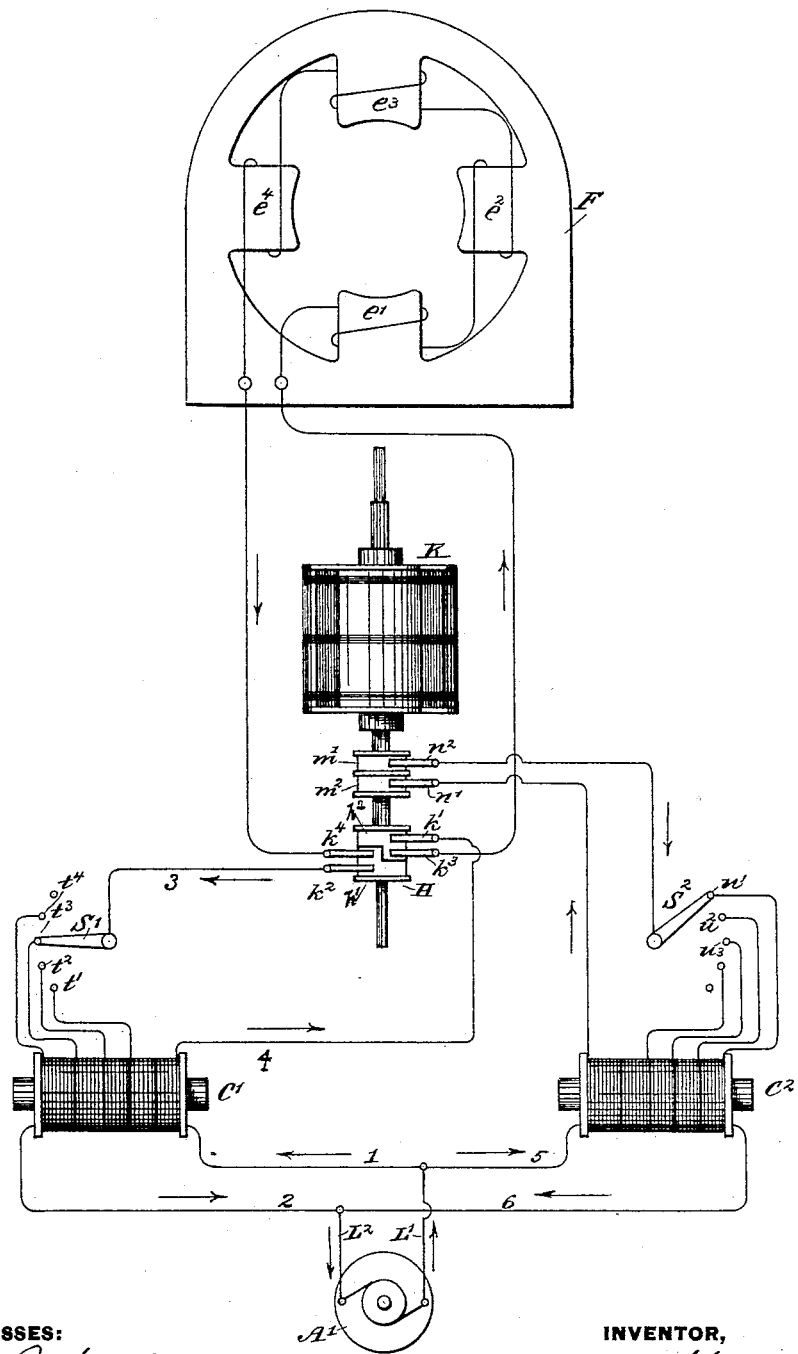
WITNESSES:
Jennie P. Ashley,
Caroline E. Davidson,
INVENTOR,
O. B. Shallenberger
by
Pope Edgcomb & Terry Att'ys.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

ALTERNATE-CURRENT ELECTRIC MOTOR.

SPECIFICATION forming part of Letters Patent No. 398,457, dated February 26, 1889.

Application filed March 20, 1888. Serial No. 267,843. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Alternate-Current Electric Motors, (Case No. 195,) of which the following is a specification.

The invention relates to the class of electric motors designed to be operated by alternating electric currents, and the object is to provide a motor which will start readily from a state of rest and gradually increase its speed until it reaches a maximum dependent upon the rate of alternations of the electric current.

In carrying out the invention it is designed to apply independent electro-motive forces to the armature and the field-magnet coils and to control the potentials, as may be required, during the increasing speed of the armature. Electric currents are supplied to the armature through a converter, reducing the potential of the current upon the main line in case it is too great to be handled conveniently. Such a converter serves, also, to vary the potential applied to the armature in a manner similar to that which would be accomplished by the use of a rheostat. A second converter supplies the current to the field-magnet coils, and this is so proportioned that the lowest potential it can yield is suitable for the operation of the motor after it has attained a proper speed and the flow of current has become continuous in direction, by reason of a commutating device carried upon the shaft of the armature. When the motor is started, the alternations take place in the direction of the current delivered to both the field-magnet and the armature, and the current will continue to alternate through both until the armature has attained a proper speed. When this speed is attained, however, the commutating device, through which the currents are supplied thereto, will serve to render continuous in direction the current delivered to the field-magnet, while that delivered to the armature remains alternating.

The invention will be described more in detail in connection with the accompanying drawing, which is a diagram illustrating a general organization of apparatus for carrying out the invention.

Referring to the figure, A' represents a suitable source of alternating, pulsatory, or intermittent electric currents.

L' and L² represent conductors leading from the respective poles thereof. The primary coil of a converter, C', of any suitable character, is connected by conductors 1 and 2 between the conductors L' and L². The secondary coil of this converter is connected at one terminal with a conductor, 4, leading through the current-rectifying device H to the field-magnet coils $e'$ $e^2$, &c., of the motor. A conductor, 3, also leading to the device H, may be placed in connection with different points in the length of the secondary coil of the converter C' by means of a switch, S'. This switch may be placed in contact with switch-points $t'$ $t^2$ $t^3$ $t^4$, connected with different points of the length of the secondary coil.

The brushes $k'$ and $k^2$, with which the conductors 4 and 3 are connected, are continually in contact with the conducting-plates $h'$ $h^2$ of the device H. Two brushes, $k^3$ and $k^4$, which are respectively connected with the terminals of the field-magnet coils, make contact with these plates alternately. When, therefore, the armature is revolving in synchronism with the reversals in the currents supplied thereto, the current delivered to the field-magnet coils $e'$ $e^2$ $e^3$ $e^4$ will be continuous in direction.

The currents for the armature K of the motor are supplied through a second converter, $C^2$. The primary coil of this converter is connected between the conductors L' and L² by conductors 5 and 6. The secondary coil of the armature, whose active length is adjustable by means of a switch, $S^2$, applied to points $u'$ $u^2$ $u^3$, has its respective terminals connected with brushes $n'$ and $n^2$, resting upon contact-rings $m'$ and $m^2$. These rings are respectively connected with the terminals of the armature-coils. Alternating currents will therefore be continuously supplied to the armature-coils.

Currents having potentials independent of each other are thus supplied to the armature and field-magnet coils, and these are independently controllable. The converter C² is introduced for the purpose of reducing the potential of the current upon the supply-circuit in case that it is too high to be handled conveniently, and also to vary the potential of the current upon the armature in the same manner as would be accomplished by the use of a rheostat. This exception, however, should be noticed: By means of the converter approximately the same difference of potential will be supplied to the armature even under considerable variation of current as the armature acquires speed, whereas in the case of a rheostat it is evident that as the current increases the difference of potential would be decreased by reason of the greater difference of potential included in the rheostat itself.

The converter C′, through which current is supplied to the field-magnet, is so proportioned that the lowest electro-motive force which it can produce will be suitable for operation after the armature has attained a proper speed and the field-magnet current becomes continuous in direction. It should be noted that the current in the field is alternating, as well as that in the armature, at all speeds except that of synchronism, the commutator acting simply to reverse the relative directions of the two currents at a given instant until the speed is attained.

It is evident that the relative positions of the armature and field may be reversed, so that the armature remains stationary and is traversed by the alternating current, while the field revolves and is supplied by a commutated current or periodically-changed alternating current, as described. Such transposition is well known and has been frequently employed.

I claim as my invention—

1. The combination, with the field-magnet and armature of an electric motor, of a converter having its primary coil supplied with alternating, intermittent, or pulsatory electric currents and its secondary coil connected with the armature-coils, and a second converter having its primary coil connected with a source of alternating, intermittent, or pulsatory electric currents and its secondary coil connected with the field-magnet coils of the motor.

2. The combination, with the field-magnet and armature of an electric motor, of a converter having its primary coil supplied with alternating, intermittent, or pulsatory electric currents and its secondary coil connected with the armature-coils, a second converter having its primary coil connected with a source of alternating, intermittent, or pulsatory electric currents, a rectifying commutator upon the armature-shaft of the motor, and circuit-connections from the secondary coil of the second converter through said rectifying-commutator with the field-magnet coils.

3. The combination, with the field-magnet and armature of an electric motor, of a converter having its primary coil supplied with alternating, intermittent, or pulsatory electric currents and its secondary coil connected with the armature-coil, a second converter having its primary coil connected with a source of alternating, intermittent, or pulsatory electric currents and its secondary coil connected with the field-magnet coils of the motor, and means for varying the ratio of conversion of one of said converters.

4. The combination, with the field-magnet and armature of an electric motor, of a converter having its primary coil supplied with alternating, intermittent, or pulsatory electric currents and its secondary coil connected with the armature-coils, a second converter having its primary coil connected with a source of alternating, intermittent, or pulsatory electric currents, a rectifying-commutator upon the armature-shaft of the motor, circuit-connections from the secondary coil of the second converter through said rectifying-commutator with the field-magnet coils, and means for varying the ratio of conversion of both of said converters.

5. The combination, with a source of alternating, intermittent, or pulsatory electric currents and a circuit therefor, of an electric converter having its primary connected in said circuit, a revolving armature having its coils connected in the circuit of the secondary coil of the converter, a second converter connected with said source of currents, a field-magnet applied to the armature included in the secondary circuit of the second converter, and a rectifying-commutator interposed in said secondary circuit between the field-magnet and the converter.

In testimony whereof I have hereunto subscribed my name this 12th day of January, A. D. 1888.

OLIVER B. SHALLENBERGER.

Witnesses:
FREDK. DARLINGTON,
DANL. W. EDGECOMB.